US009844088B2

(12) United States Patent
Wakayama

(10) Patent No.: US 9,844,088 B2
(45) Date of Patent: Dec. 12, 2017

(54) DOWNLOAD METHOD AND WIRELESS COMMUNICATION DEVICE

(71) Applicant: FUJITSU LIMITED, Kawasaki-shi, Kanagawa (JP)

(72) Inventor: Atsushi Wakayama, Hachioji (JP)

(73) Assignee: FUJITSU LIMITED, Kawasaki (JP)

(*) Notice: Subject to any disclaimer, the term of this patent is extended or adjusted under 35 U.S.C. 154(b) by 97 days.

(21) Appl. No.: 15/059,862

(22) Filed: Mar. 3, 2016

(65) Prior Publication Data
US 2016/0295480 A1 Oct. 6, 2016

(30) Foreign Application Priority Data
Apr. 1, 2015 (JP) .................................. 2015-075403

(51) Int. Cl.
| | | |
|---|---|---|
| H04W 76/02 | (2009.01) | |
| H04L 29/06 | (2006.01) | |
| H04W 84/12 | (2009.01) | |
| H04W 88/06 | (2009.01) | |

(52) U.S. Cl.
CPC ........... *H04W 76/026* (2013.01); *H04L 69/14* (2013.01); *H04W 84/12* (2013.01); *H04W 88/06* (2013.01)

(58) Field of Classification Search
CPC ... H04W 84/12; H04W 88/06; H04W 76/026; H04W 36/16; H04W 36/14; H04L 69/14
See application file for complete search history.

(56) References Cited

U.S. PATENT DOCUMENTS

| | | | |
|---|---|---|---|
| 2006/0089997 A1* | 4/2006 | Inokuchi | ................. H04L 67/06 709/228 |
| 2014/0029527 A1* | 1/2014 | Okuda | ................ H04W 72/085 370/329 |

FOREIGN PATENT DOCUMENTS

| | | |
|---|---|---|
| EP | 2 670 104 A1 | 12/2013 |
| WO | 2009/142059 A1 | 11/2009 |

OTHER PUBLICATIONS

Extended (Supplementary) European Search Report dated Apr. 29, 2016, issued in counterpart European Patent Application No. 16158339.8. (11 pages).

(Continued)

*Primary Examiner* — Lakeram Jangbahadur
(74) *Attorney, Agent, or Firm* — Westerman, Hattori, Daniels & Adrian, LLP

(57) ABSTRACT

A download method for downloading data includes assigning a download range of the data to each of the plurality of sessions based on size of the data, the plurality of sessions including a first session employing a first communication system and a second session employing a second communication system; downloading the data of the download range assigned to each of the plurality of sessions in each of the plurality of sessions in parallel; assigning a part of a first download range assigned to the first session to the second session when it is determined that a first communication situation in the first communication system is inferior to a second communication situation in the second communication system, the part of the first download rage being not downloaded; and downloading part of the data corresponding to the part of the first download range in the second session.

9 Claims, 13 Drawing Sheets

(56) References Cited

OTHER PUBLICATIONS

Lee Wonbo, et al., "E$PA: Energy, Usage ($), and Performance-Aware LTE-WiFi Adaptive Activation Scheme for Smartphones", Proceeding of IEE International Symposium on a World of Wireless, Mobile and Multimedia Networks 2014, IEEE, pp. 1-9, XP032656374.
"Integrated Femto-WiFi (IFW) Networks", Small Cell Forum, Feb. 28, 2012, XP055145624, pp. 1-37. Cited in the European Office Action dated Jan. 2, 2017.
European Office Action dated Jan. 2, 2017, issued in counterpart European Patent Application No. 16 158 339.8. (7 pages).
European Office Action dated Apr. 26, 2017, issued in counterpart European Patent Application No. 16158339.8. (7 pages).

* cited by examiner

FIG. 5

| THREAD ID | START ADDRESS | END ADDRESS | STATES | ADDRESS OF ALREADY-RECEIVED DATA |
|---|---|---|---|---|
| C1 | 1M BYTE | 4M-1 BYTES | IN RECEPTION | $A_{C1}$ BYTES |
| C2 | 4M BYTES | 7M-1 BYTES | COMPLETED | 7M-1 BYTES |
| ⋮ | ⋮ | ⋮ | ⋮ | ⋮ |
| C16 | 46M BYTES | 49M-1 BYTES | IN RECEPTION | $A_{C16}$ BYTES |
| W1 | 49M BYTES | 52M-1 BYTES | IN RECEPTION | $A_{W1}$ BYTES |
| W2 | 52M BYTES | 55M-1 BYTES | IN RECEPTION | $A_{W2}$ BYTES |
| ⋮ | ⋮ | ⋮ | ⋮ | ⋮ |
| W16 | 94M BYTES | 97M-1 BYTES | IN RECEPTION | $A_{W16}$ BYTES |

FIG. 6

| THREAD ID | START ADDRESS | END ADDRESS | STATES | ADDRESS OF ALREADY-RECEIVED DATA |
|---|---|---|---|---|
| C1 | 1M BYTE | 4M-1 BYTES | IN RECEPTION | $B_{C1}$ BYTES |
| C2 | $B_{W2}$+1 BYTES | 55M-1 BYTES | COMPLETED | $B_{C2}$ BYTES |
| ⋮ | ⋮ | ⋮ | ⋮ | ⋮ |
| C16 | 46M BYTES | 49M-1 BYTES | IN RECEPTION | $B_{C16}$ BYTES |
| W1 | 49M BYTES | 52M-1 BYTES | IN RECEPTION | $B_{W1}$ BYTES |
| W2 | 52M BYTES | 55M-1 BYTES | IN RECEPTION | $B_{W2}$ BYTES |
| ⋮ | ⋮ | ⋮ | ⋮ | ⋮ |
| W16 | 94M BYTES | 97M-1 BYTES | IN RECEPTION | $B_{W16}$ BYTES |

DOWNLOAD METHOD AND WIRELESS COMMUNICATION DEVICE

CROSS-REFERENCE TO RELATED APPLICATION

This application is based upon and claims the benefit of priority of the prior Japanese Patent Application No. 2015-075403, filed on Apr. 1, 2015, the entire contents of which are incorporated herein by reference.

FIELD

Techniques disclosed in the present embodiment are related to a technique for downloading data in a split manner.

BACKGROUND

In communication using plural paths, the communication is often continued with switching of the path when the communication situation in one path deteriorates. For example, a related art is disclosed in International Publication Pamphlet No. WO 2009/142059.

SUMMARY

According to an aspect of the invention, a download method for downloading data includes assigning a download range of the data to each of the plurality of sessions based on size of the data, the plurality of sessions including a first session employing a first communication system and a second session employing a second communication system among a plurality of kinds of communication systems; downloading the data of the download range assigned to each of the plurality of sessions in each of the plurality of sessions in parallel; assigning a part of a first download range assigned to the first session to the second session when it is determined that a first communication situation in the first communication system is inferior to a second communication situation in the second communication system, the part of the first download rage being not downloaded; and downloading part of the data corresponding to the part of the first download range in the second session.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a table;

FIG. 6 is a diagram illustrating an example of a table;

DESCRIPTION OF EMBODIMENT

In the case of carrying out split download by plural sessions using plural paths, there is a case in which it is not necessarily good to switch download by the session using the path in which the communication situation is bad to download by another session using another path.

In one aspect, an object of the techniques disclosed in the embodiment is to enhance the efficiency of split download.

Figure 1:
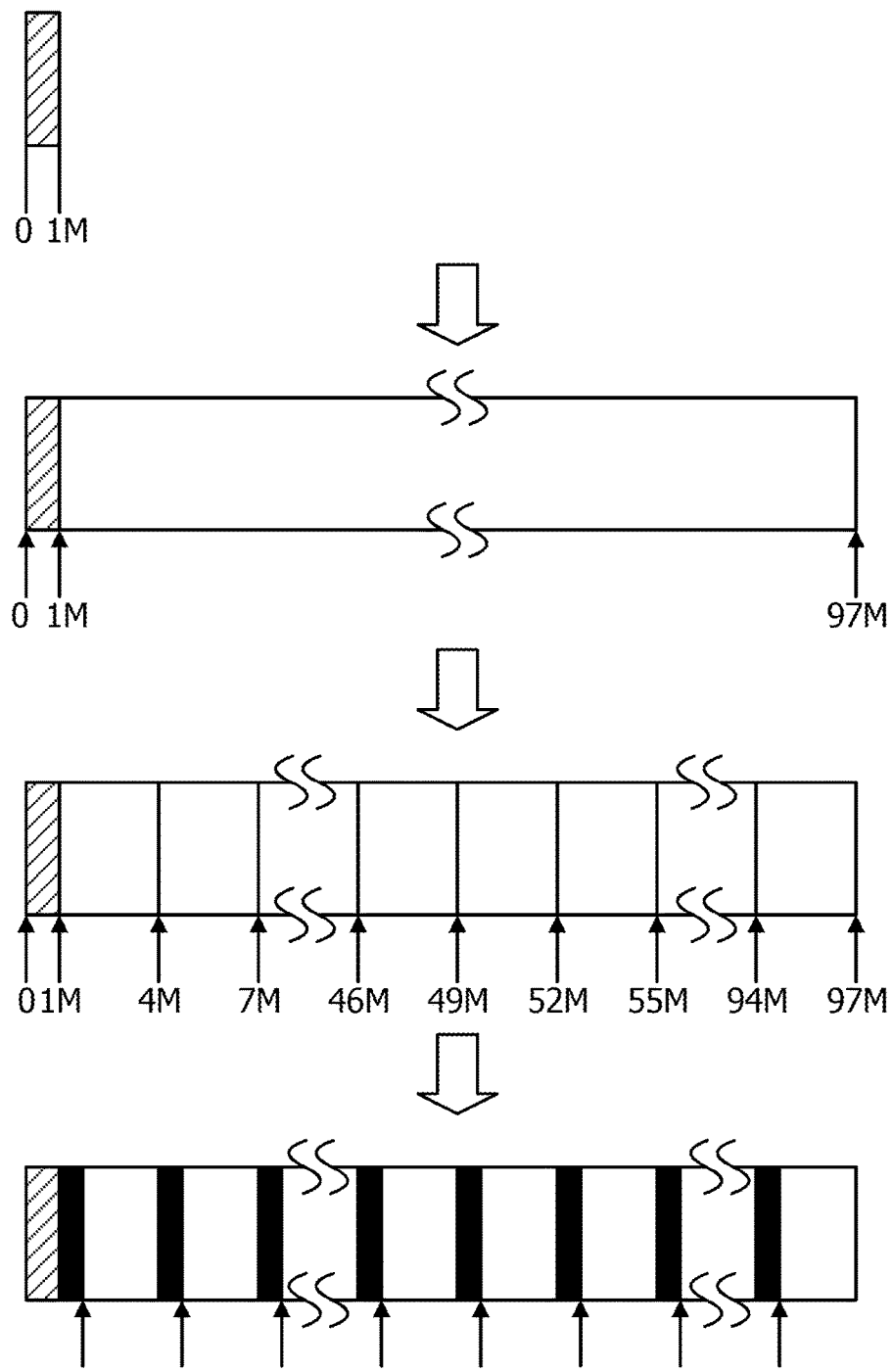
FIG. 1 is a diagram illustrating a procedure of split download.

In FIG. 1, the procedure of split download is illustrated. As illustrated on the first row, a wireless communication device acquires a beginning block of data from a server on a WEB. In this example, the size of the beginning block is 1 M (mega) byte. In the beginning block, a value indicating the size of the whole data is set.

As illustrated on the second row, the wireless communication device ensures a data storing area equivalent to the size of the whole data. In this example, the size of the whole data is 97 M bytes. The size of the remaining data obtained by subtracting the size of the beginning block from the size of the whole data is divided by a given number of splits to calculate the data size per one block. In this example, 96 M bytes as the size of the remaining data is divided by the number of splits, 32, so that a data size of 3 M bytes per one block is obtained. Arrows illustrated on the third row indicate boundaries between blocks.

Downloads of the respective blocks are carried out in parallel. Data received from the beginning of each block is stored in the data storing area. Areas blacked out on the fourth row represent the ranges of the already-received data. Furthermore, arrows indicate the final addresses of the already-received data. In the present embodiment, the respective downloads are carried out by threads. Furthermore, the wireless communication device uses 16 threads that carry out the download by using a communication path of a cellular system and 16 threads that carry out the download by using a communication path of a wireless LAN (Local Area Network) system.

Figure 2:
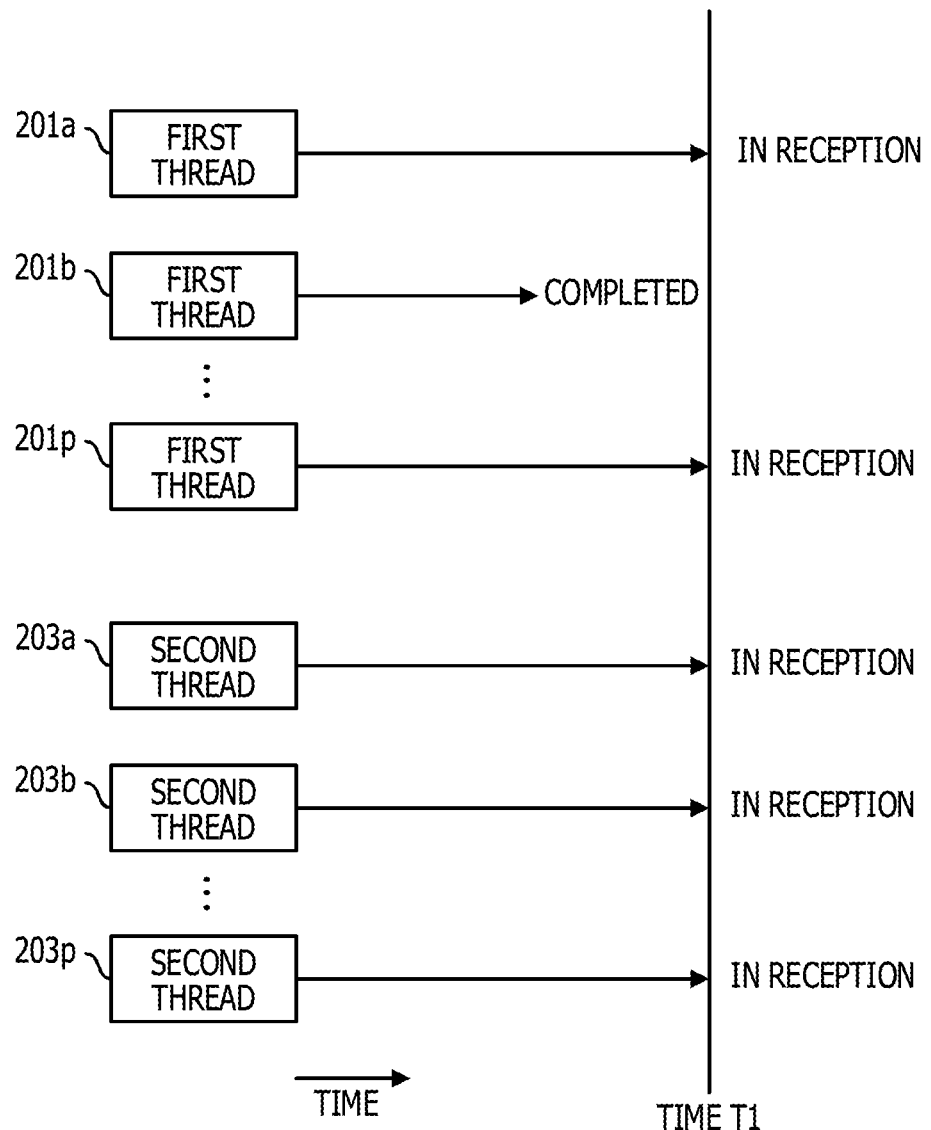
FIG. 2 is a diagram illustrating an example of status in split download.

FIG. 2 illustrates an example of status in split download. A first thread 201*a* to a first thread 201*p* carry out download by using a communication path of a cellular system. A second thread 203*a* to a second thread 203*p* carry out download by using a communication path of a wireless LAN system. FIG. 2 represents the elapse of time from the start of the split download. At a time T1, the first thread 201*b* has completed the download of the assigned range. Therefore, the status of the first thread 201*b* is "completed." None of the threads other than the first thread 201*b* have yet completed the download of the assigned range. Therefore, the status of the threads other than the first thread 201*b* is "in reception."

Suppose that, at this time, the communication situation in the communication path of the wireless LAN system deteriorates. In the present embodiment, if the communication situation in one communication path deteriorates, the download by the thread using this one communication path is switched to download by the thread using the other communication path.

Figure 3:
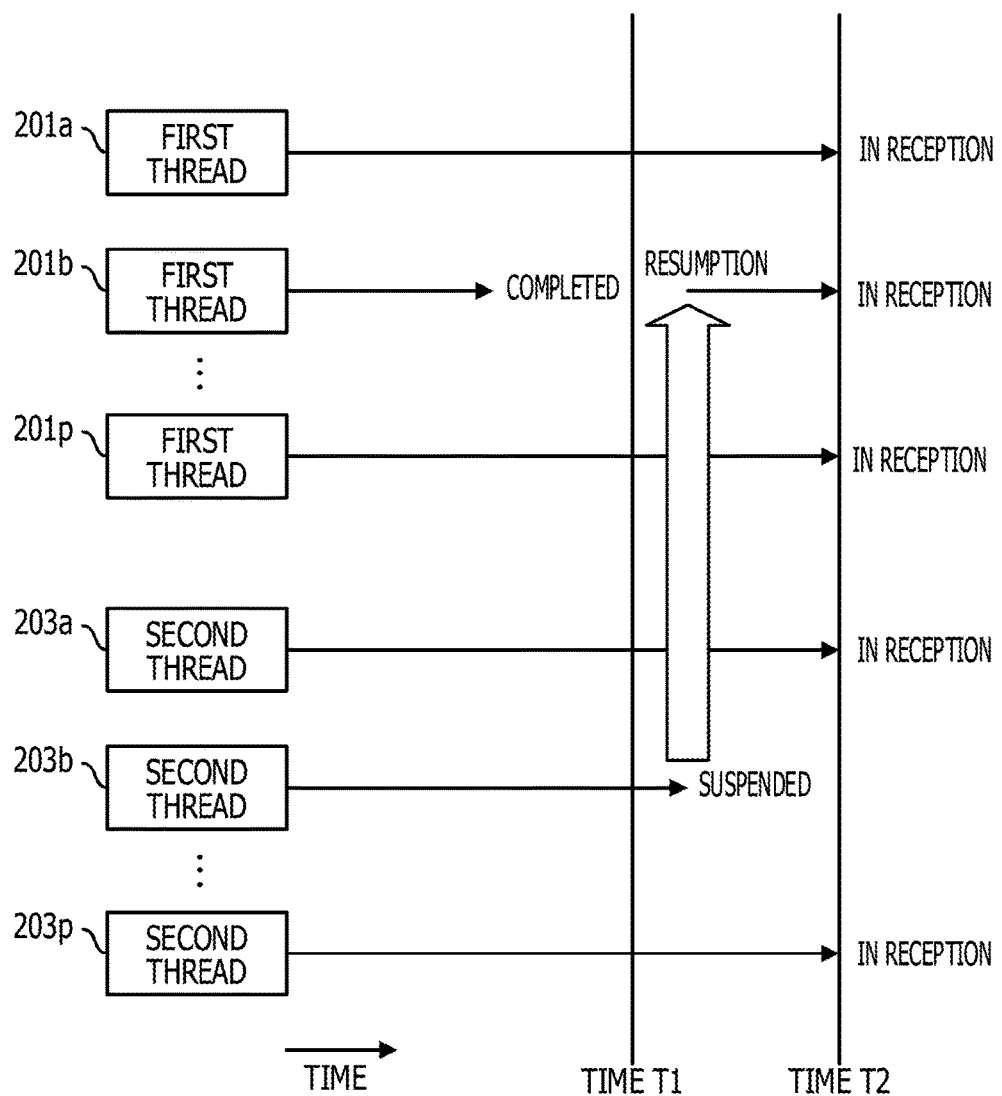
FIG. 3 is a diagram for explaining switching of a thread that carries out download.

FIG. 3 is a diagram for explaining switching of a thread that carries out download. A thread whose throughput is low is selected among the second thread 203a to the second thread 203p and the download by the second thread 203 is suspended. In this example, the download by the second thread 203b is suspended. Then, the data in the range that has not yet been received in the second thread 203b is downloaded in the first thread 201b that has already completed the original download. That is, the first thread 201b resumes the download. At a time T2 in this example, the status of the second thread 203b is "suspended." The status of the threads other than the second thread 203b is "in reception."

This completes the download earlier than the case of continuing the download in the second thread 203b. However, an overhead accompanying the switching of the thread, change in the communication situation, or temporary throughput lowering in the thread by which download is resumed, or the like often becomes a cause that may inhibit the efficiency enhancement.

Figure 4:
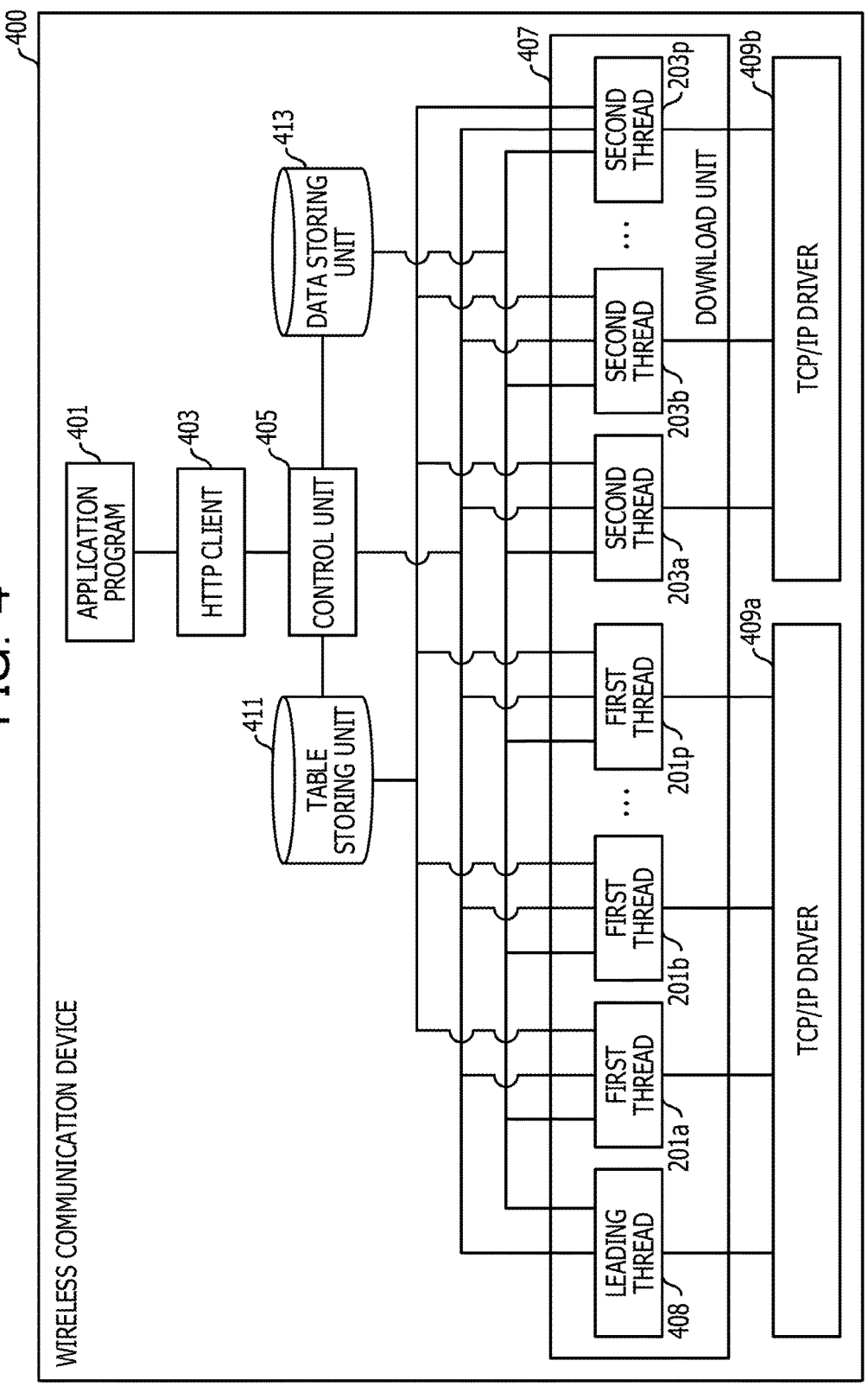
FIG. 4 is a diagram illustrating a module configuration example of a wireless communication device.

FIG. 4 illustrates a module configuration example of a wireless communication device 400. The wireless communication device 400 includes an application program 401, a HTTP (HyperText Transfer Protocol) client 403, a control unit 405, a download unit 407, TCP (Transmission Control Protocol)/IP (Internet Protocol) drivers 409, a table storing unit 411, and a data storing unit 413.

The application program 401 is a browser for example. The HTTP client 403 receives a request for access to a server on a WEB from the application program 401 and carries out control based on the HTTP. The control unit 405 selects communication paths to be used and controls download. The download unit 407 includes plural threads that establish a session between the thread and the server on the WEB and receive data from the server by a range request.

In this example, the download unit 407 includes 16 first threads 201a to 201p that acquire data corresponding to blocks by using a communication path of a cellular system and 16 second threads 203a to 203p that acquire data corresponding to blocks by using a communication path of a wireless LAN system besides a leading thread 408 that acquires the beginning block explained in FIG. 1. Each of the first thread 201a to the first thread 201p and the second thread 203a to the second thread 203p operates in parallel.

The TCP/IP driver 409a carries out control based on the TCP and IP in the communication path of the cellular system. The TCP/IP driver 409b carries out control based on the TCP and IP in the communication path of the wireless LAN system.

The table storing unit 411 stores a table to manage the threads. In the data storing unit 413, a data storing area for storing received data is set.

The above-described HTTP client 403, control unit 405, and download unit 407 are implemented by using a hardware resource (for example FIG. 13) and a program that causes a processor to execute processing to be described below.

Figure 13:
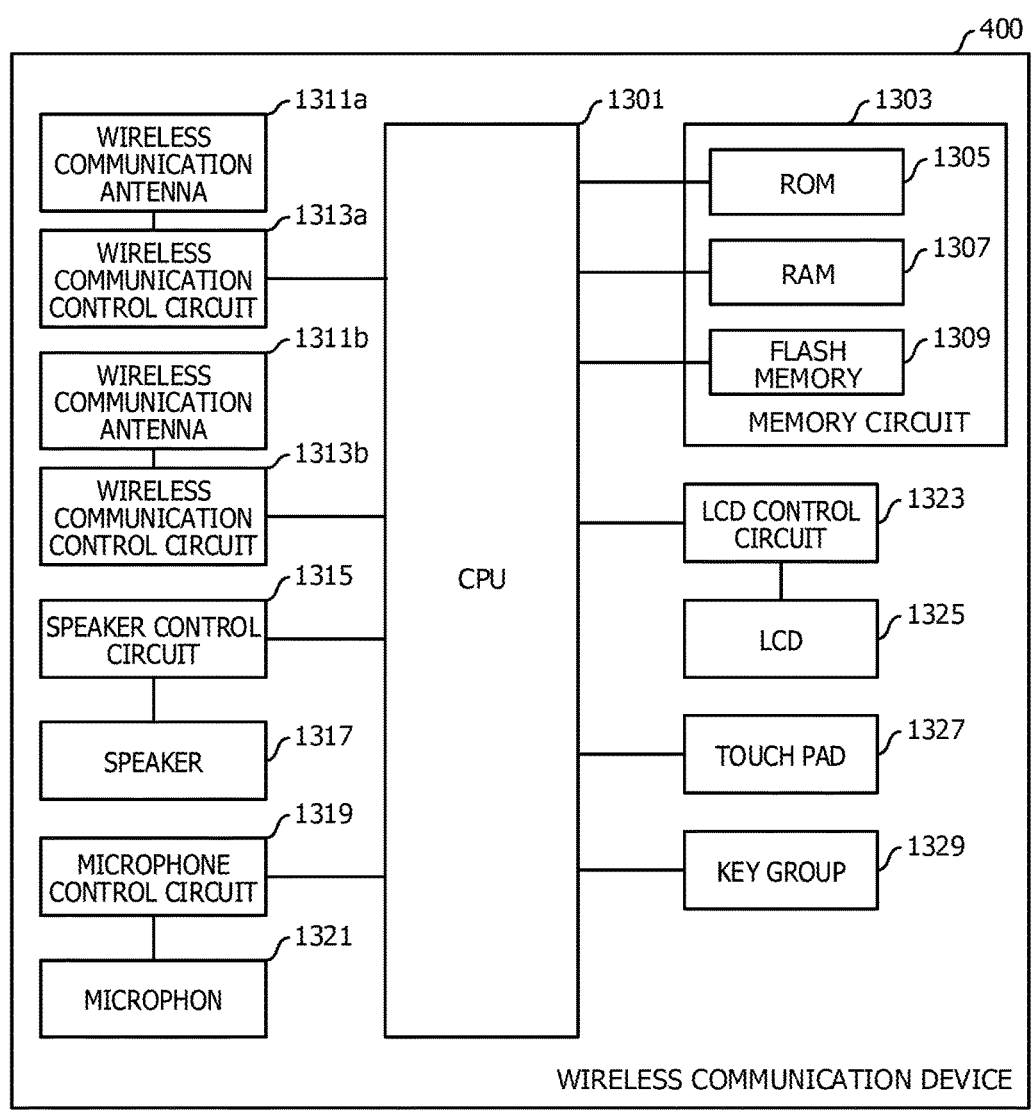
FIG. 13 is a diagram illustrating a hardware configuration example of a wireless communication device.

The above-described table storing unit 411 and data storing unit 413 are implemented by using a hardware resource (for example FIG. 13).

FIG. 5 and FIG. 6 illustrate examples of a table stored in the table storing unit 411. The table in this example includes records corresponding to the threads. The record of the table includes a field for setting a thread ID, a field for setting a start address, a field for setting an end address, a field for setting status, and a field for setting the address of already-received data. The thread ID is the identification for identifying the thread. In this example, C1 to C16 indicate the first thread 201a to the first thread 201p, respectively. Similarly, W1 to W16 indicate the second thread 203a to the second thread 203p, respectively. The start address and the end address indicate the range of the data to be downloaded in the relevant thread. In the status, "in reception," "completed," or "suspended" representing the state of the relevant thread is set. The address of already-received data indicates the final address of the data that has been already received in the relevant thread.

FIG. 5 represents the state of the table at the time T1 represented in FIG. 2. The first thread 201b of the thread ID "C2" has already received data from a start address of 4M bytes to an end address of 7M−1 bytes. Therefore, the address of already-received data corresponds with the end address 7M−1 bytes. On the other hand, the address of already-received data in the threads other than the first thread 201b indicates an address between the start address and the end address.

FIG. 6 represents the state of the table at the time T2 represented in FIG. 3. The second thread 203b of the thread ID "W2" has suspended the download. The second thread 203b has received data to $B_{W2}$ bytes at the suspension timing. That is, data in the range from a start address of $B_{W2}+1$ bytes to an end address of 55M−1 bytes has not yet been received. On the other hand, the status of the first thread 201b of the thread ID "C2" that has resumed the download is "in reception." As the range of the data to be downloaded by the first thread 201b, the range of the data that has not been received in the second thread 203b (start address of $B_{W2}+1$ bytes and end address of 55M−1 bytes) is set. The address $B_{c2}$ of already-received data in the first thread 201b indicates an address between the start address $B_{W2}+1$ bytes and the end address 55M−1 bytes.

Figure 7:
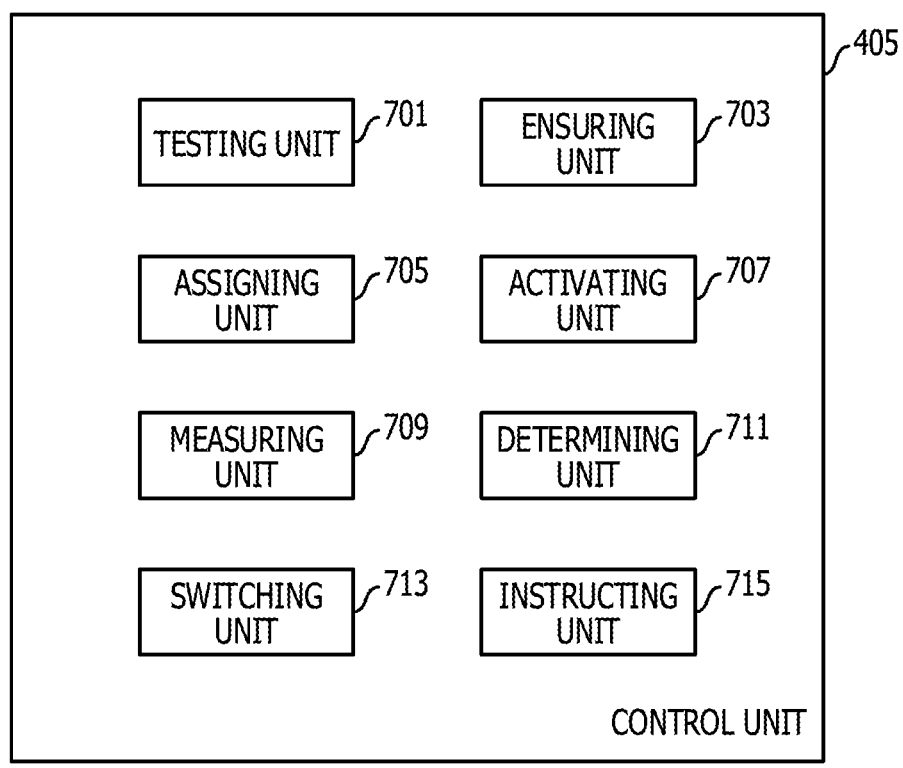
FIG. 7 is a diagram illustrating a module configuration example of a control unit.

FIG. 7 illustrates a module configuration example of the control unit 405. The control unit 405 includes a testing unit 701, an ensuring unit 703, an assigning unit 705, an activating unit 707, a measuring unit 709, a determining unit 711, a switching unit 713, and an instructing unit 715.

The testing unit 701 carries out various kinds of checks. The ensuring unit 703 ensures a data storing area. The assigning unit 705 assigns the range of data to be received to each thread. The activating unit 707 activates the first threads 201 and the second threads 203. The measuring unit 709 measures the throughput of each first thread 201 and each second thread 203. Furthermore, the measuring unit 709 calculates the throughput in the communication path of the cellular system, i.e. the sum of the values indicating the throughputs of the respective first threads 201. Moreover, the measuring unit 709 calculates the throughput in the communication path of the wireless LAN system, i.e. the sum of the values indicating the throughputs of the respective second threads 203. The determining unit 711 carries out various kinds of determinations. The throughput used by the determining unit 711 in each determination processing to be described later may be a moving average for example.

The switching unit 713 switches the thread that carries out download. The instructing unit 715 instructs the first thread 201 and the second thread 203 to stop. The throughput in the communication path of the cellular system and the throughput in the communication path of the wireless LAN system may be measured by a measuring unit provided outside the control unit 405.

The above-described testing unit 701, ensuring unit 703, assigning unit 705, activating unit 707, measuring unit 709, determining unit 711, switching unit 713, and instructing unit 715 are implemented by using a hardware resource (for example FIG. 13) and a program that causes a processor to execute processing to be described below.

Figure 8:
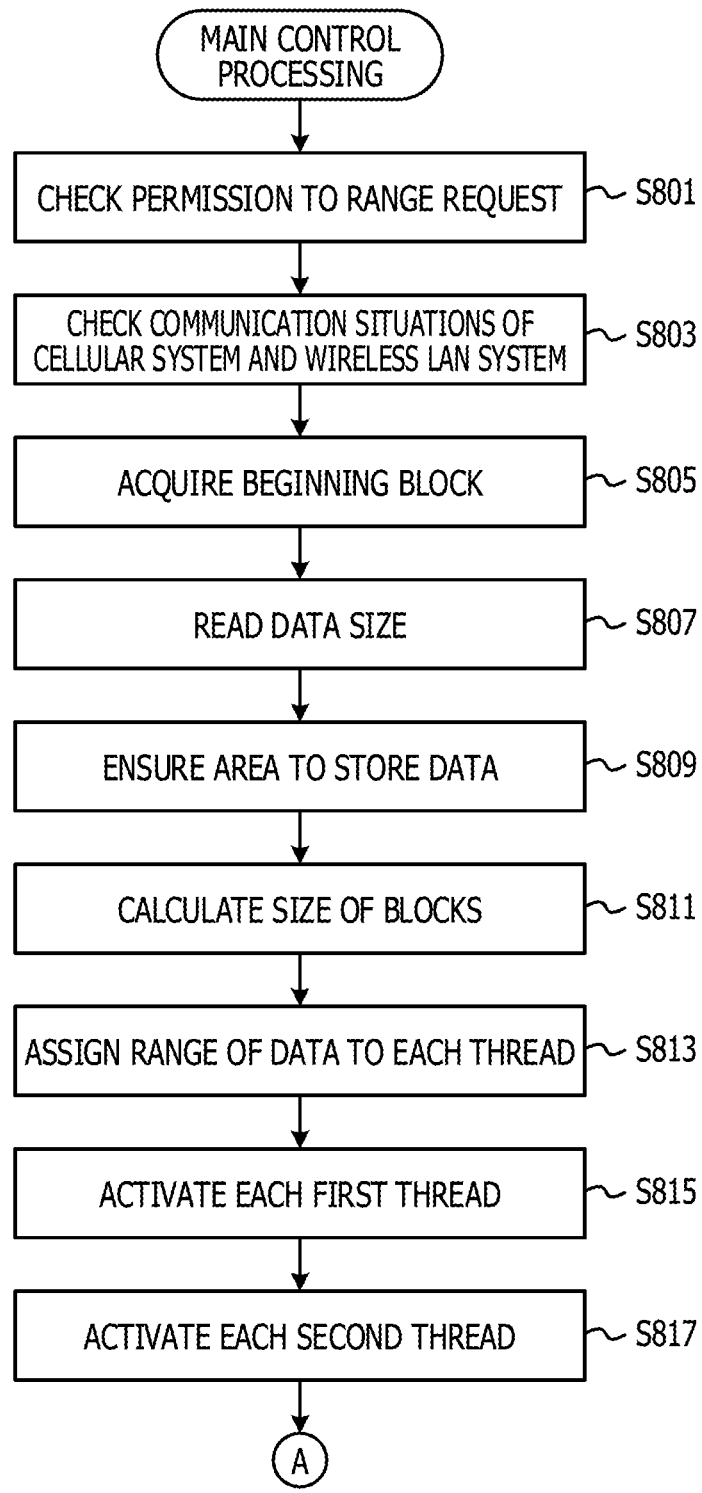
FIG. 8 is a diagram illustrating an example of a main processing flow.

Processing in the wireless communication device 400 will be described below. FIG. 8 illustrates an example of a main processing flow. The testing unit 701 checks whether a server on a WEB permits a range request (S801). If the server on the WEB does not permit the range request, split download is not carried out. Processing when the server on the WEB does not permit the range request is based on an existing technique and therefore will not be further described.

The testing unit 701 checks the communication situation of the cellular system and the communication situation of the wireless LAN system (S803). If the communication situation of the cellular system and the communication situation of the wireless LAN system are good, the following processing is executed. If at least one of the communication situation of the cellular system and the communication situation of the wireless LAN system is bad, the following processing is not executed. Processing when at least one of the communication situation of the cellular system and the communication situation of the wireless LAN system is bad is based on an existing technique and therefore will not be further described.

The leading thread 408 acquires the beginning block (for example 1 M byte) of the data to be received (S805). The leading thread 408 stores the acquired beginning block in the data storing unit 413. In this example, the leading thread 408 uses the TCP/IP driver 409a. However, the leading thread 408 may use the TCP/IP driver 409b.

The ensuring unit 703 reads the data size from the beginning block (S807). The ensuring unit 703 ensures the area to store the data subsequent to the beginning block in the data storing unit 413 (S809).

The assigning unit 705 calculates the size of blocks (S811). For example, the assigning unit 705 divides the size of the remaining data obtained by subtracting the size of the beginning block from the data size by the number of threads (in this example, 32) to obtain the size of the blocks. However, the size of the blocks does not have to be even.

The assigning unit 705 assigns the range of the data to be received in each thread on the basis of the size of the blocks (S813). The assigned range (start address and end address) is set in each record of the table. The ranges assigned to the respective threads do not overlap. Furthermore, the ranges assigned to the threads cover the whole of the data to be received.

Figure 9:
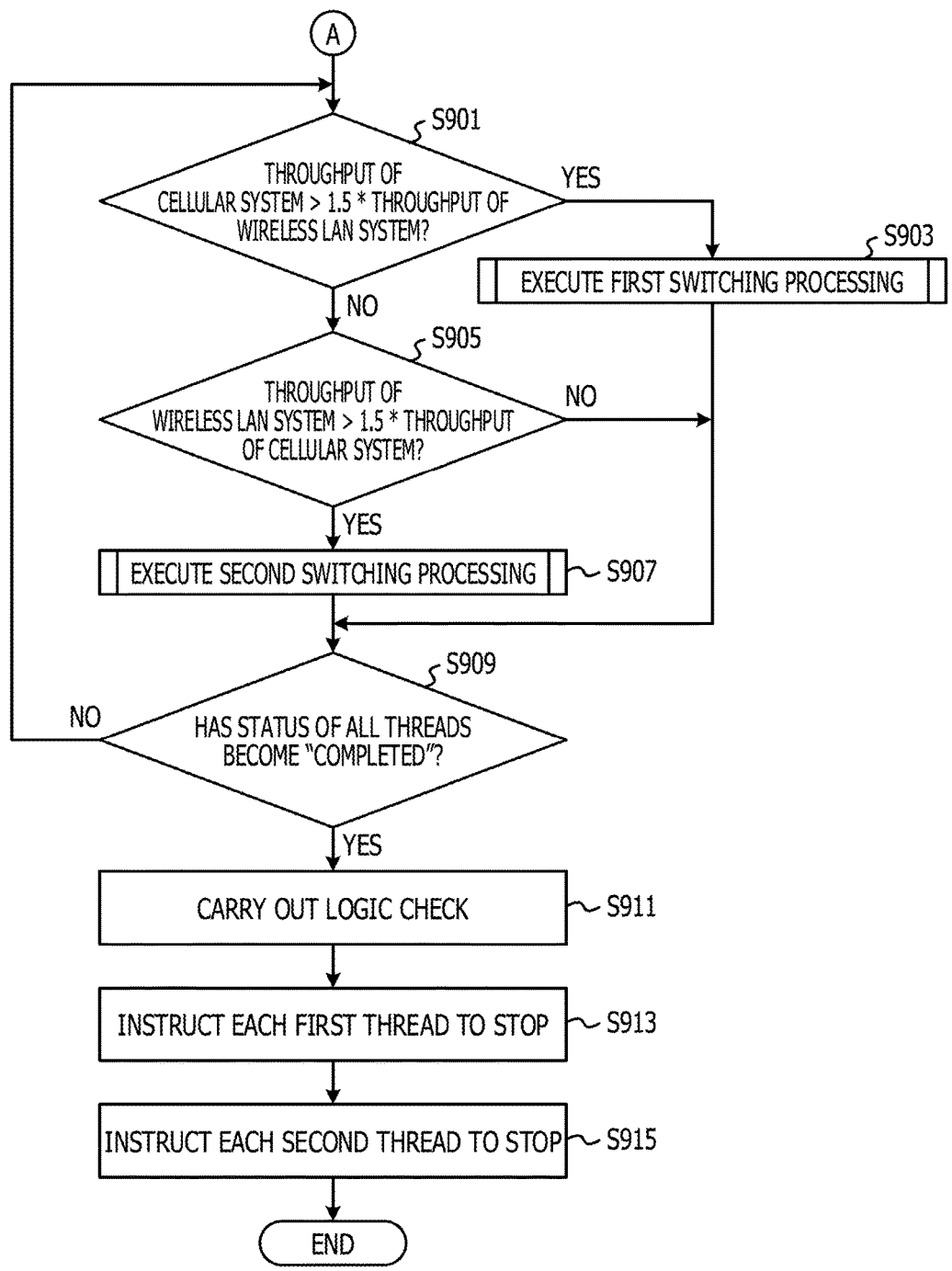
FIG. 9 is a diagram illustrating an example of the main processing flow.

The activating unit 707 activates each first thread 201 (S815). Moreover, the activating unit 707 activates each second thread 203 (S817). Upon the activation of each first thread 201 and each second thread 203, the download starts. Processing of the first threads 201 and the second threads 203 will be described later by using FIG. 12. The processing flow proceeds to processing of S901 illustrated in FIG. 9 through a connector A.

The determining unit 711 determines whether or not the throughput of the cellular system is higher than 1.5 times the throughput of the wireless LAN system (S901). The throughput of the cellular system is the sum of values indicating throughputs in the first thread 201a to the first thread 201p. The throughput of the wireless LAN system is the sum of values indicating throughputs in the second thread 203a to the second thread 203p. The value by which the throughput of the wireless LAN system is multiplied may be another value as long as the value is equal to or larger than 1. This value is set in consideration of a factor such as an overhead accompanying the switching of the thread, change in the communication situation, or temporary throughput lowering in the thread by which download is resumed, for example.

If the determining unit 711 determines that the throughput of the cellular system is higher than 1.5 times the throughput of the wireless LAN system, the control unit 405 executes first switching processing (S903). The first switching processing will be described later by using FIG. 10. After the end of the first switching processing, the processing flow proceeds to processing of S909.

If determining that the throughput of the cellular system is not higher than 1.5 times the throughput of the wireless LAN system, the determining unit 711 determines whether or not the throughput of the wireless LAN system is higher than 1.5 times the throughput of the cellular system (S905). The value by which the throughput of the cellular system is multiplied may be another value as long as the value is equal to or larger than 1. This value is set in consideration of a factor such as an overhead accompanying the switching of the thread, change in the communication situation, or temporary throughput lowering in the thread by which download is resumed for example.

If the determining unit 711 determines that the throughput of the wireless LAN system is higher than 1.5 times the throughput of the cellular system, the control unit 405 executes second switching processing (S907). The second switching processing will be described later by using FIG. 11. After the end of the second switching processing, the processing flow proceeds to the processing of S909.

On the other hand, if the determining unit 711 determines that the throughput of the wireless LAN system is not higher than 1.5 times the throughput of the cellular system, the processing flow directly proceeds to the processing of S909.

The determining unit 711 determines whether or not the status of all threads has become "completed" (S909). If the determining unit 711 determines that the status of at least one thread has not become "completed," the processing flow returns to the processing represented in S901 and the above-described processing is repeated.

On the other hand, if the determining unit 711 determines that the status of all threads has become "completed," the testing unit 701 carries out a logic check on the received data (S911). In the logic check, the testing unit 701 checks overlapping of data or the format of the data, for example. If the data involves an error, download is carried out again, for example.

If the data is correct, the instructing unit 715 instructs each first thread 201 to stop (S913). Moreover, the instructing unit 715 instructs each second thread 203 to stop (S915). Then, the main processing is ended.

Although the example in which the communication situation is determined on the basis of the throughput is described above, the communication situation may be determined on the basis of the reception intensity. That is, the first switching processing may be executed if a value indicating the reception intensity in the wireless LAN system is small, for example. Furthermore, the second switching processing may be executed if a value indicating the reception intensity in the cellular system is small. In addition, the communication situation may be determined on the basis of the throughput and the reception intensity.

Figure 10:
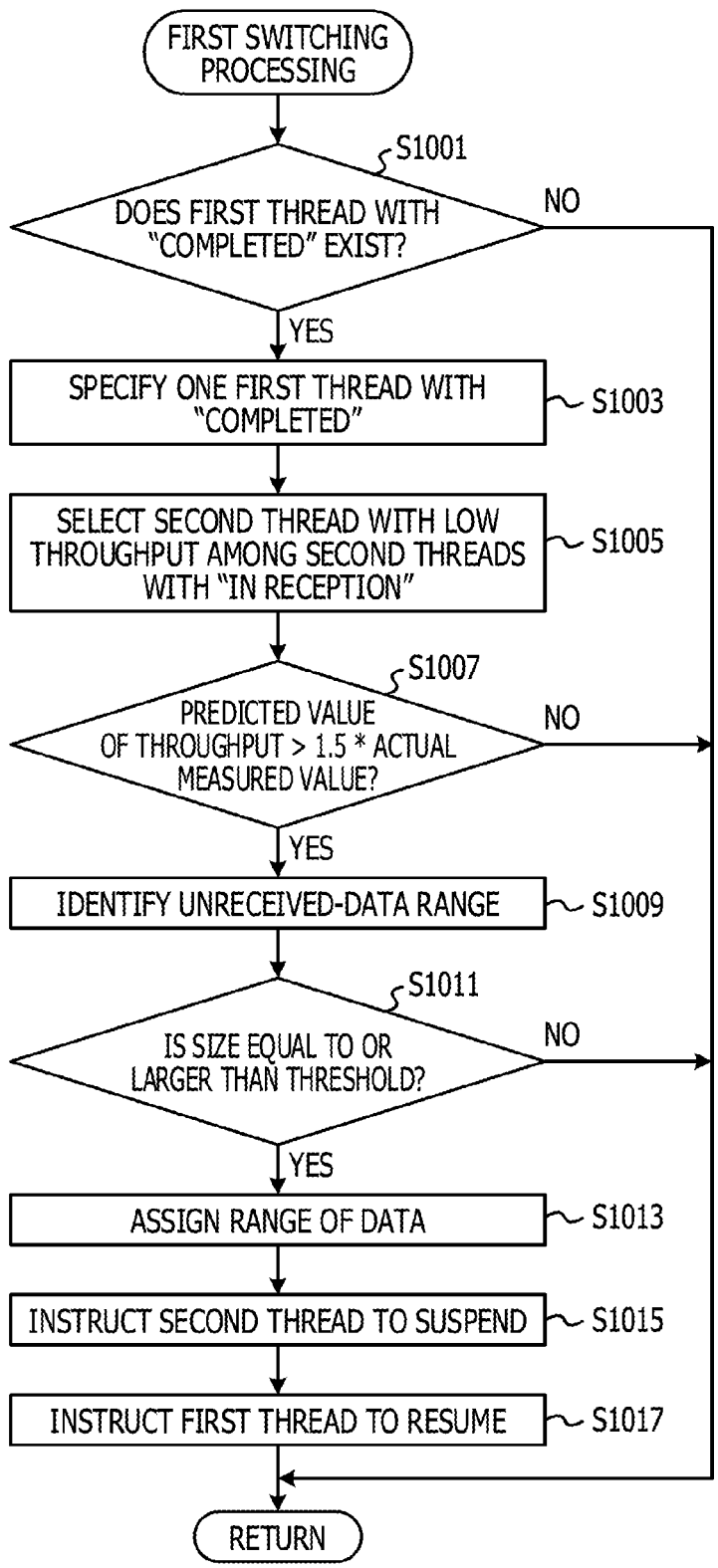
FIG. 10 is a diagram illustrating an example of a first switching processing flow.

FIG. 10 illustrates an example of the first switching processing flow. The determining unit 711 determines whether or not the first thread 201 about which "completed" is set in the status exists (S1001). If the determining unit 711 determines that the first thread 201 about which "completed" is set in the status does not exist, the first switching processing is ended without operation. This is because the thread serving as the switching target does not exist. This causes no useless waiting time.

If there are plural first threads 201 about which "completed" is set in the status, the switching unit 713 specifies one first thread 201 among the plural first threads 201 (S1003). If the number of first threads 201 about which "completed" is set in the status is one, the switching unit 713 specifies this first thread 201.

The switching unit 713 selects one second thread 203 whose throughput is low among the second threads 203 about which "in reception" is set in the status (S1005). The determining unit 711 determines whether or not a predicted value of the throughput in the first thread 201 specified in S1003 is larger than 1.5 times an actual measured value of the throughput in the second thread 203 selected in S1005 (S1007). The value by which the actual measured value of the throughput in the second thread 203 is multiplied may be another value as long as the value is equal to or larger than 1. Furthermore, the predicted value of the throughput in the first thread 201 is the average of the throughputs in the other first threads 201, for example.

If the determining unit 711 determines that the predicted value is not larger than 1.5 times the actual measured value, the first switching processing is ended without operation. This is because it is envisaged that the effect by the switching of the thread may not be expected when factors such as an overhead are considered, for example.

If the determining unit 711 determines that the predicted value is larger than 1.5 times the actual measured value, the switching unit 713 identifies the unreceived-data range in the second thread 203 selected in S1005 (S1009). For example, a value obtained by adding 1 to the address of already-received data in the record corresponding to this second thread 203 is the start address of the unreceived-data range. Furthermore, the end address in the record corresponding to this second thread 203 is the end address of the unreceived-data range.

The determining unit 711 determines whether or not the size of the unreceived-data range is equal to or larger than a threshold (S1011). If the determining unit 711 determines that the size of the unreceived-data range is not equal to or larger than the threshold, the first switching processing is ended without operation. This is because it is envisaged that the effect by the switching of the thread may not be expected when factors such as an overhead are considered for example.

If the determining unit 711 determines that the size of the unreceived-data range is equal to or larger than the threshold, the switching unit 713 assigns the range of the data to be received to the first thread 201 specified in S1003 (S1013). For example, the switching unit 713 sets the unreceived-data range identified in S1009 as the range of data in the record corresponding to the first thread 201 specified in S1003. The switching unit 713 instructs the second thread 203 selected in S1005 to suspend the download (S1015). Then, the switching unit 713 instructs the first thread 201 specified in S1003 to resume the download (S1017).

The above-described processing of S1007 may be omitted and the processing flow may proceed to the processing of S1009 subsequently to the processing of S1005. The above-described processing of S1011 may be omitted and the processing flow may proceed to the processing of S1013 subsequently to the processing of S1009. Furthermore, the above-described processing of S1007 and S1011 may be omitted and the processing flow may proceed to the processing of S1009 subsequently to the processing of S1005 and then proceed to the processing of S1013.

Furthermore, if the determining unit 711 determines in S1005 that the number of remaining second threads 203 with "in reception" is one, the first switching processing may be ended without operation. This allows the measuring unit 709 to continue the measurement of the throughput in the communication path of the wireless LAN system.

Figure 11:
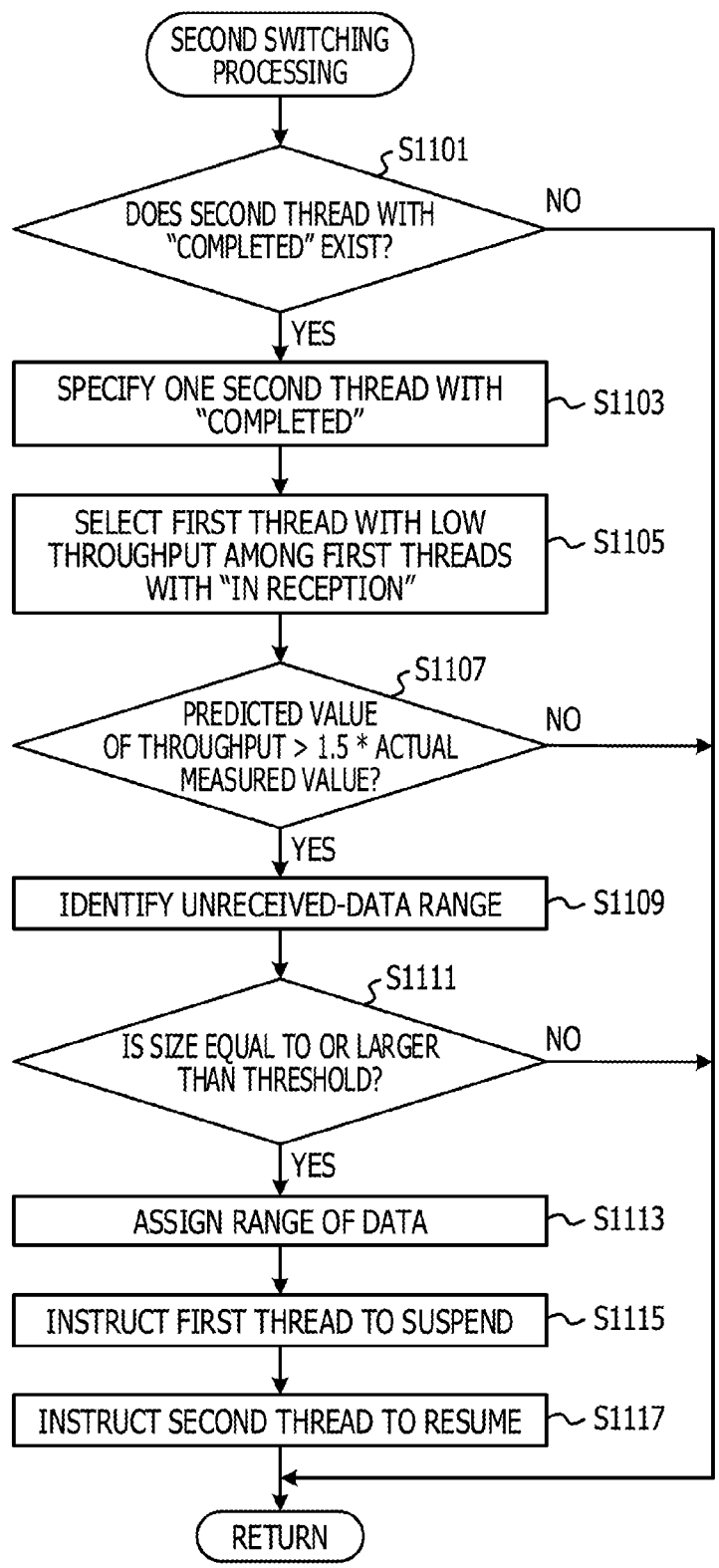
FIG. 11 is a diagram illustrating an example of a second switching processing flow.

FIG. 11 illustrates an example of the second switching processing flow. The determining unit 711 determines whether or not the second thread 203 about which "completed" is set in the status exists (S1101). If the determining unit 711 determines that the second thread 203 about which "completed" is set in the status does not exist, the second switching processing is ended without operation. This is because the thread serving as the switching target does not exist. This causes no useless waiting time.

If there are plural second threads 203 about which "completed" is set in the status, the switching unit 713 specifies one second thread 203 among the plural second threads 203 (S1103). If the number of second threads 203 about which "completed" is set in the status is one, the switching unit 713 specifies this second thread 203.

The switching unit 713 selects one first thread 201 whose throughput is low among the first threads 201 about which "in reception" is set in the status (S1105). The determining unit 711 determines whether or not a predicted value of the throughput in the second thread 203 specified in S1103 is larger than 1.5 times an actual measured value of the throughput in the first thread 201 selected in S1105 (S1107). The value by which the throughput in the first thread 201 is multiplied may be another value as long as the value is equal to or larger than 1. Furthermore, the predicted value of the throughput in the second thread 203 is the average of the throughputs in the other second threads 203, for example.

If the determining unit 711 determines that the predicted value is not larger than 1.5 times the actual measured value, the second switching processing is ended without operation. This is because it is envisaged that the effect by the switching of the thread may not be expected when factors such as an overhead are considered, for example.

If the determining unit 711 determines that the predicted value is larger than 1.5 times the actual measured value, the switching unit 713 identifies the unreceived-data range in the first thread 201 selected in S1105 (S1109). For example, a value obtained by adding 1 to the address of already-received data in the record corresponding to this first thread 201 is the start address of the unreceived-data range. Furthermore, the end address in the record corresponding to this first thread 201 is the end address of the unreceived-data range.

The determining unit 711 determines whether or not the size of the unreceived-data range is equal to or larger than a threshold (S1111). If the determining unit 711 determines that the size of the unreceived-data range is not equal to or larger than the threshold, the second switching processing is ended without operation. This is because it is envisaged that the effect by the switching of the thread may not be expected when factors such as an overhead are considered, for example.

If the determining unit 711 determines that the size of the unreceived-data range is equal to or larger than the threshold, the switching unit 713 assigns the range of the data to be received to the second thread 203 specified in S1103 (S1113). For example, the switching unit 713 sets the unreceived-data range identified in S1109 as the range of data in the record corresponding to the second thread 203 specified in S1103. The switching unit 713 instructs the first thread 201 selected in S1105 to suspend the download (S1115). Then, the switching unit 713 instructs the second thread 203 specified in S1103 to resume the download (S1117).

The above-described processing of S1107 may be omitted and the processing flow may proceed to the processing of S1109 subsequently to the processing of S1105. The above-described processing of S1111 may be omitted and the processing flow may proceed to the processing of S1113 subsequently to the processing of S1109. Furthermore, the above-described processing of S1107 and S1111 may be omitted and the processing flow may proceed to the processing of S1109 subsequently to the processing of S1105 and then proceed to the processing of S1113.

Furthermore, if the determining unit 711 determines in S1105 that the number of remaining first threads 201 with "in reception" is one, the second switching processing may be ended without operation. This allows the measuring unit 709 to continue the measurement of the throughput in the communication path of the cellular system.

Although the examples in which one thread is switched are given in the above-described first switching processing and second switching processing, two or more threads may be switched. That is, part of threads whose communication situation is inferior may be switched.

Figure 12:
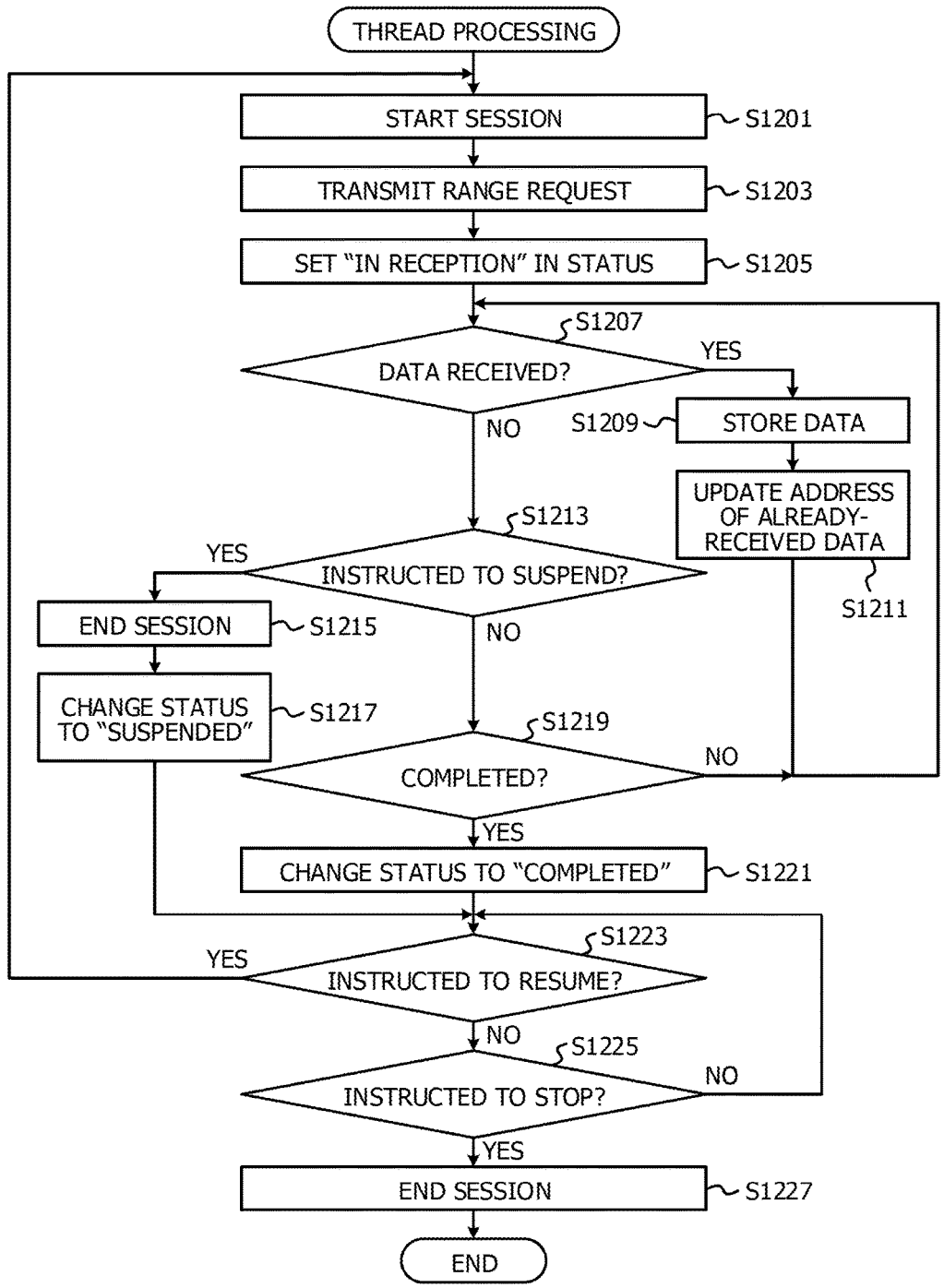
FIG. 12 is a diagram illustrating an example of a thread processing flow.

FIG. 12 illustrates, an example of a thread processing flow. First, thread processing by the first thread 201 will be described. The first thread 201 starts a session between the first thread 201 and a server on a WEB (S1201). The first thread 201 transmits a range request to the server on the WEB via the TCP/IP driver 409a (S1203). For example, the first thread 201 specifies the range of data set in the record of this first thread 201 and requests the server on the WEB to cause download. Then, the first thread 201 sets "in reception" in the status in the record of this first thread 201 (S1205).

The first thread 201 determines whether or not data is received (S1207). If determining that data is received, the first thread 201 stores the received data in a data storing area (S1209). Then, the first thread 201 updates the address of already-received data (S1211). For example, the first thread 201 sets the final address of the stored data as the address of already-received data in the record of this first thread 201. Then, the first thread 201 returns to S1207 to repeat the above-described processing.

If determining in S1207 that data is not received, the first thread 201 determines whether or not the first thread 201 is instructed to suspend the download (S1213). If determining that the first thread 201 is instructed to suspend the download, the first thread 201 ends the session (S1215). Moreover, the first thread 201 changes the status in the record of this first thread 201 to "suspended" (S1217). Then, the first thread 201 proceeds to processing of S1223.

If determining that the first thread 201 is not instructed to suspend the download, the first thread 201 determines whether or not the download has been completed (S1219). For example, the first thread 201 determines that the download has been completed if the address of already-received data in the record corresponding to this first thread 201 coincides with the end address in the same record.

If determining in S1219 that the download has not been completed, the first thread 201 returns to S1207 to repeat the above-described processing.

On the other hand, if determining that the download has been completed, the first thread 201 changes the status in the record of this first thread 201 to "completed" (S1221). Then, the first thread 201 proceeds to processing of S1223.

The first thread 201 determines whether or not the first thread 201 is instructed to resume the download (S1223). If determining that the first thread 201 is instructed to resume the download, the first thread 201 returns to the processing represented in S1201 to repeat the above-described processing. However, the processing of S1201 may be omitted if the session holds.

If determining that the first thread 201 is not instructed to resume the download, the first thread 201 determines whether or not the first thread 201 is instructed to stop (S1225). If determining that the first thread 201 is not instructed to stop, the first thread 201 returns to S1223 to repeat the above-described processing.

On the other hand, if determining that the first thread 201 is instructed to stop, the first thread 201 ends the session (S1227). Then, the first thread 201 ends the thread processing.

Subsequently, thread processing in the second thread 203 will be described. In S1203, the second thread 203 transmits a range request to a server on a WEB via the TCP/IP driver 409b. That is, in the processing in the second thread 203, the TCP/IP driver 409b is used instead of the TCP/IP driver 409a. The other processing is the same as the processing in the case of the first thread 201.

The hardware configuration of the wireless communication device 400 will be described. FIG. 13 is a diagram illustrating a hardware configuration example of the wireless communication device 400. The wireless communication device 400 includes a CPU 1301, a memory circuit 1303, a wireless communication antenna 1311a, a wireless communication control circuit 1313a, a wireless communication antenna 1311b, a wireless communication control circuit 1313b, a speaker control circuit 1315, a speaker 1317, a microphone control circuit 1319, a microphone 1321, an LCD control circuit 1323, an LCD 1325, a touch pad 1327, and a key group 1329.

The CPU 1301 is composed of a modem CPU (Central Processing Unit) and an application CPU in some cases. The memory circuit 1303 includes a ROM (Read Only Memory) 1305, a RAM (Random Access Memory) 1307, and a flash memory 1309, for example. The ROM 1305 stores programs such as an operating system and data set in advance, for example. The RAM 1307 includes an area into which various kinds of programs are expanded, for example. The RAM 1307 also includes an area that stores temporary data. The flash memory 1309 stores various kinds of programs and various kinds of data, for example.

The LCD control circuit 1323 drives the LCD 1325. The LCD 1325 displays an operation screen in the application program 401, for example. The touch pad 1327 is a panel sensor disposed over a display screen of the LCD 1325 for example and accepts instructions by touch operation. For example, the touch pad 1327 is used as a touch panel obtained by integrating the LCD 1325 and the touch pad 1327. Each hardware key of the key group 1329 is provided at part of the casing.

The wireless communication antenna 1311a receives radio waves based on the cellular system. The wireless communication control circuit 1313a controls wireless communication according to the frequency used in the cellular system. The wireless communication antenna 1311b receives radio waves based on the wireless LAN system.

The wireless communication control circuit 1313b controls wireless communication according to the frequency used in the wireless LAN system.

The speaker control circuit 1315 carries out digital/analog conversion relating to sound data. The speaker 1317 outputs analog data as a sound. The speaker 1317 outputs the sound. The microphone control circuit 1319 carries out analog/digital conversion relating to sound data. The microphone 1321 converts a sound to analog data.

According to the present embodiment, the efficiency of split download can be enhanced.

Furthermore, it is determined that the communication situation in the wireless LAN system is inferior if a value obtained by multiplying the throughput of the wireless LAN system by a given value is smaller than the value of the throughput of the cellular system. Moreover, it is determined that the communication situation in the cellular system is inferior if a value obtained by multiplying the throughput of the cellular system by a given value is smaller than the value of the throughput of the wireless LAN system. This can suppress the frequency of the thread switching.

In addition, the thread is not switched if the first thread 201 that has completed download does not exist in the first switching processing or if the second thread 203 that has completed download does not exist in the second switching processing. Thus, a useless waiting time is not caused.

Moreover, the second thread 203 with a low throughput is selected in the first switching processing or the first thread 201 with a low throughput is selected in the second switching processing. Thus, the effect of the efficiency enhancement by the thread switching increases.

Furthermore, it is determined whether or not to switch download of an unreceived-data range on the basis of the result of comparison between a predicted value of the throughput by the thread after the switching and an actual performance value of the throughput by the thread before the switching. This can avoid the thread switching that yields a low degree of improvement.

Moreover, download of an unreceived-data range is not switched if the size of the unreceived-data range is smaller than a threshold. This can avoid the thread switching that yields a low degree of improvement.

Although one embodiment of the present invention is described above, the present invention is not limited thereto. For example, the above-described functional block configuration does not correspond with the program module configuration in some cases.

Furthermore, the configurations of the respective storing areas described above are one example and do not necessarily need to be configurations like the above-described configurations. Moreover, also in the processing flows, changing the order of the processing and executing plural kinds of processing in parallel may also be carried out if the processing result does not change.

Summarizing the above-described embodiment provides the following.

A wireless communication method of one aspect includes (A) processing of assigning a range of data to be split-downloaded to each of plural sessions using any of plural communication paths, (B) processing of downloading the data of the assigned range in each of the plural sessions in parallel, and (C) switching processing of switching download of an unreceived-data range in part of sessions using any one communication path among the plural communication paths to a session using the other communication path if it is determined that the communication situation in the one communication path is inferior.

This can enhance the efficiency of the split download.

Furthermore, in the switching processing, it may be determined that the communication situation in the one communication path is inferior if a value obtained by multiplying the throughput in the one communication path by a given value is smaller than the value of the throughput in the other communication path.

This can suppress the frequency of the session switching.

Moreover, in the switching processing, the download of the unreceived-data range may be switched if a session that has completed the download of the data of the range exists among plural sessions using the other communication path.

This does not cause a waiting time.

In addition, in the switching processing, a session with a low throughput may be selected among the plural sessions using the one communication path.

This can increase the effect of the efficiency enhancement by the session switching.

Furthermore, in the switching processing, whether or not to switch the download of the unreceived-data range may be determined on the basis of the result of comparison between a predicted value of the throughput by the session after the switching of the download and an actual performance value of the throughput by the session before the switching of the download.

This can avoid the session switching that yields a low degree of improvement.

Moreover, in the switching processing, the switching of the download of the unreceived-data range may be cancelled if the size of the unreceived-data range is smaller than a threshold.

This can avoid the session switching that yields a low degree of improvement.

A program for causing a processor to execute the above-described processing can be created and this program may be stored in a computer-readable storing medium or storing device such as flexible disk, CD-ROM, magneto-optical disk, semiconductor memory, and hard disk for example. An intermediate processing result is temporarily retained in a storing device such as a main memory in general.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A download method for downloading data, executed by a computer, the download method comprising:
   assigning a download range of the data to each of the plurality of sessions based on size of the data, the plurality of sessions including a first session employing a first communication system and a second session employing a second communication system among a plurality of kinds of communication systems;
   downloading the data of the download range assigned to each of the plurality of sessions in each of the plurality of sessions in parallel;
   assigning a part of a first download range assigned to the first session to the second session when it is determined that a first communication situation in the first communication system is inferior to a second communication system in the second communication system, the part of the first download rage being not downloaded;
downloading part of the data corresponding to the part of the first download range in the second session;
determining that the first communication situation is inferior to the second communication situation when a value obtained by multiplying a first throughput in the first session group by a given value is smaller than a value of a second throughput in the second session group; and
determining whether to assign the part of the first download range to the second session based on a comparison between a predicted value of the second throughput in the second session and an actual performance value of the first throughput in the first session,
wherein the part of first download range is assigned to the second session when a size of the part of the data is larger than a threshold.

2. The download method according to claim 1, wherein the first session is identified from a first session group using the first communication system when it is determined that the first communication situation is inferior to the second communication situation, and the first session has a low throughput in the first group.

3. The download method according to claim 2, wherein the second session is identified from a second session group using the second communication system when it is determined that the first communication situation is inferior to the second communication situation, and the second session has completed the downloading of assigned download range in the second session group.

4. A non-transitory computer-readable storage medium storing a download program for causing a computer to execute a process for downloading data, the process comprising:
assigning a download range of the data to each of the plurality of sessions based on size of the data, the plurality of sessions including a first session employing a first communication system and a second session employing a second communication system among a plurality of kinds of communication systems;
downloading the data of the download range assigned to each of the plurality of sessions in each of the plurality of sessions in parallel;
assigning a part of a first download range assigned to the first session to the second session when it is determined that a first communication situation in the first communication system is inferior to a second communication situation in the second communication system, the part of the first download rage being not downloaded;
downloading part of the data corresponding to the part of the first download range in the second session;
determining that the first communication situation is inferior to the second communication situation when a value obtained by multiplying a first throughput in the first session group by a given value is smaller than a value of a second throughput in the second session group; and
determining whether to assign the part of the first download range to the second session based on a comparison between a predicted value of the second throughout in the second session and an actual performance value of the first throughput in the first session,
wherein the part of first download range is assigned to the second session when a size of the part of the data is larger than a threshold.

5. The non-transitory computer-readable storage medium according to claim 4, wherein the first session is identified from a first session group using the first communication system when it is determined that the first communication situation is inferior to the second communication situation, and the first session has a low throughput in the first group.

6. The non-transitory computer-readable storage medium according to claim 5, wherein the second session is identified from a second session group using the second communication system when it is determined that the first communication situation is inferior to the second communication situation, and the second session has completed the downloading of assigned download range in the second session group.

7. A wireless communication device for downloading data, the wireless communication device comprising:
a memory; and
a processor coupled to the memory and configured to:
assign a download range of the data to each of the plurality of sessions based on size of the data, the plurality of sessions including a first session employing a first communication system and a second session employing a second communication system among a plurality of kinds of communication systems;
download the data of the download range assigned to each of the plurality of sessions in each of the plurality of sessions in parallel;
assign a part of a first download range assigned to the first session to the second session when it is determined that a first communication situation in the first communication system is inferior to a second communication situation in the second communication system, the part of the first download rage being not downloaded;
download part of the data corresponding to the part of the first download range in the second session;
determine that the first communication situation is inferior to the second communication situation when a value obtained by multiplying a first throughout in the first session group by a given value is smaller than a value of a second throughput in the second session group; and
determine whether to assign the part of the first download range to the second session based on a comparison between a predicted value of the second throughput in the second session and an actual performance value of the first throughput in the first session,
wherein the part of first download range is assigned to the second session when a size of the part of the data is larger than a threshold.

8. The wireless communication device according to claim 7, wherein the first session is identified from a first session group using the first communication system when it is determined that the first communication situation is inferior to the second communication situation, and the first session has a low throughput in the first group.

9. The wireless communication device according to claim 8, wherein the second session is identified from a second session group using the second communication system when it is determined that the first communication situation is inferior to the second communication situation, and the second session has completed the downloading of assigned download range in the second session group.

* * * * *